United States Patent [19]
Balser et al.

[11] 4,438,264
[45] Mar. 20, 1984

[54] PROCESS FOR THE PRODUCTION OF HYDROXYETHYL METHYL CELLULOSE

[75] Inventors: Klaus Balser, Walsrode; Helwig Tuebner, Hanau; Wilhelm Oppermann, Bomlitz, all of Fed. Rep. of Germany

[73] Assignee: Bayer Aktiengesellschaft, Leverkusen, Fed. Rep. of Germany

[21] Appl. No.: 423,272

[22] Filed: Sep. 24, 1982

[30] Foreign Application Priority Data

Oct. 14, 1981 [DE] Fed. Rep. of Germany ....... 3140813

[51] Int. Cl.$^3$ .......................................... C08B 11/193
[52] U.S. Cl. ..................................................... 536/91
[58] Field of Search ......................................... 536/91

[56] References Cited

U.S. PATENT DOCUMENTS 2,949,452  8/1960  Savage ................................. 536/91
3,709,876  1/1973  Glomski et al. ...................... 536/91

Primary Examiner—Ronald W. Griffin
Attorney, Agent, or Firm—Connolly and Hutz

[57] ABSTRACT

A process for the production of hydroxyethyl methyl cellulose having a flocculation point of at least 100° C. by carrying out the alkalization and hydroxyethylation of the cellulose in liquid methyl chloride.

4 Claims, No Drawings

PROCESS FOR THE PRODUCTION OF HYDROXYETHYL METHYL CELLULOSE

This invention relates to a process for the production of pure white hydroxyethyl methyl celluloses (HEMC), the alkalisation of the cellulose being carried out in the presence of liquid methyl chloride and the alkali cellulose being reacted with ethylene oxide.

It is known from the German Auslegeschrift No. 1,468,048 that hydroxypropyl methyl cellulose can be produced in a liquid methyl chloride phase. In this process, at least 4 parts by weight of methyl chloride are used to 1 part by weight of air-dry cellulose during the action of propylene oxide on sodium cellulose, i.e. at least 12.8 moles of methyl chloride are required per mole of air-dry cellulose. Alkalisation is carried out before the reaction with propylene oxide immersing the cellulose sheets in 30 to 50% NaOH and subsequently removing the sodium hydroxide under pressure up to from 2.5 to 2.8% by weight.

In the U.S. Pat. No. 3,709,876 the production of water-soluble hydroxyethyl methyl celluloses having improved resistance to enzymes is described, wherein the alkalisation of the cellulose and the subsequent etherification being carried out in the usual way. Thus after removal of the methyl chloride during the alkalisation the reaction with ethylene oxide is carried out in the presence of another organic solvent. The presence of liquid methyl chloride is not mentioned.

The process according to the invention is characterised in that both alkalisation of the cellulose and also the etherification step are carried out in liquid methyl chloride generally from 6 to 12 moles and preferably from 7 to 8 moles of methyl chloride being used per mole of air-dry cellulose. The liquid methyl chloride phase provides for uniform alkalisation and etherification by avoiding local overheating of the cellulose, i.e. the formation of so-called heat nests.

Celluloses of the usual type, such as bleached linters or chemical wood pulps, are used as starting material for the process according to the invention. The cellulose is either dispersed preferably in liquid methyl chloride and sodium hydroxide added to the resulting dispersion for alkalisation or alternatively the cellulose is sprayed with sodium hydroxide and dispersed in methyl chloride immediately afterwards. Alkalisation in liquid methyl chloride prevents degradation of the cellulose by alkaline oxidation enabling highly viscose pure white products to be obtained.

The quantity of NaOH used for alkalisation should amount to between 1.2 and 1.4 moles and preferably to 1.35 moles of NaOH per mole of air-dry cellulose. The temperature during alkalisation should not exceed 35° C.

From 3 to 5 moles of ethylene oxide per mol of air-dry cellulose should be used for etherification, depending on the required degree of molar substitution (MS) A larger molar quantity of ethylene oxide gives products which form clearer solutions.

According to the invention, the ethylene oxide is added together with the methyl chloride before, immediately after or at the same time as the generally used 30 to 50% sodium hydroxide.

For etherification, the reaction mixture is heated to temperatures in the range of generally from 40° to 70° C. and preferably to temperatures in the range of from 40° to 55° C. Pressures generally in the range from 9 to 14 bars are established during this heating step.

The reaction is preferably carried out in pressure vessels in which the reaction mixture is optionally stirred. To obtain a neutral reaction product, the quantitity of alkali used has to be neutralised. The most advantageous way of doing this is to add a stoichiometric quantity of an organic acid such as formic acid, acetic acid or propionic acid or mixtures thereof. The excess methyl chloride is distilled off, optionally under reduced pressure, and collected in a receiver from which it may be used without further purification for a following batch or for the production of methyl cellulose or hydroxyalkylated mixed ethers thereof.

The crude product thus obtained is purified in known manner using standard solvent/water mixtures, such as methanol/water, acetone/water or methanol/acetone. Since the product obtained by the process according to the invention does not flocculate below 100° C., it cannot be purified with hot water. If, by contrast, the product obtained is converted into a temporarily water-insoluble form by partial cross-linking, purification may be carried out with cold or hot water. This cross-linking step is best carried out after neutralisation in a mildly acid medium using a bifunctional compound, such as glyoxal for example, in the presence of methyl chloride and at temperatures in the range of from 65° to 80° C. After washing, the product is dried and preferably ground in the usual way.

The products obtained are characterised on the basis of their analytically determined degrees of substitution (DS and MS) which are defind as follows:

Each anhydroglucose unit of the cellulose molecule has three OH-groups accessible to the reaction. Whereas the average degree of substitution (DS-value) is indicative of the average number of OH-groups substituted per anhydroglucose unit, the MS-value represents the average number of moles of the reactant which are bound per anhydroglucose unit. In the case of hydroxyalkyl derivatives of cellulose the MS-value is generally greater than the DS-value. The reason for this lies in the fact that, when a hydroxylalkyl group is introduced into the cellulose molecule, an additional OH-group which is also accessible to hydroxyalkylation is formed. It follows from this side chains of different length can be formed in the hydroxy-alkylation of cellulose.

The hydroxyethyl content of the products obtained by the process according to the invention may be adjusted as required in dependence upon the quantity of ethylene oxide used. A molar degree of substitution of at least 1.7, corresponding to a percentage by weight of hydroxyethyl of 41.5%, has proved to be adequate for products which form clear solutions.

The slight methylation which occurs during the etherification step results in a methoxyl content of from 9 to 13% by weight, corresponding to DS-values of from 0.6 to 0.95.

Commensurate with the high hydroxyethyl content, the inventive products have a flocculation point above 100° C. and behave in the same way as pure hydroxyethyl cellulose. They are readily soluble both in cold and in hot water and form clear, colourless solutions of which the viscosity depends upon the degree of polymerisation of the celluloses used. They can be used as additive in aqueous dispersions like dispersion colours and as additive in boring liquids for petroleum or natural gas.

EXAMPLE 1

9,100 g of ground bleached linters are introduced into a 150 liter-capacity autoclave and sprayed with 6,059 g of 50% sodium hydroxide solution. Thereafter 22,664 g of methyl chloride are added under constant stirring and following alkalisation is carried out in the methyl chloride slurry for 30 minutes.

The temperature is kept at 30° to 35° C. by cooling. 12,342 g of ethylene oxide are then added. The temperature is increased to 40° C. and kept at that level for 3 hours. A pressure of approximately 9 bars is established. On completion of etherification, 4,544 g of glacial acetic acid are introduced into the autoclave under pressure in order to neutralise the alkali present in the crude product. For crosslinking, 1,047 g of glyoxal (40% by weight) are added and the temperature is increased to 70° C., the reaction mixture then being kept at that temperature for 30 minutes.

The methyl chloride is distilled off into a receiver, followed by evacuation. Thereafter the reaction product is washed with cold water until it is free from salts, dried and grounded.

Of the originally added 22,664 g of methyl chloride, 19,477 g are recovered. After the addition of further 3,187 g of methyl chloride, the methyl chloride is used for another batch.

The HEMC thus produced is a white powder which forms a homogeneous solution in water. A 2% by weight solution has a viscosity of 53,000 mPa.s, as measured in a rotary viscometer with a shear gradient D of 2.93 sec$^{-1}$, and a pH-value of 7.8. The DS with regard to $OCH_3$ amounts to 0.93 and the MS with regard to $OC_2H_4OH$ amounts to 1.7.

EXAMPLE 2

9,100 g of a ground, highly viscous pulp are introduced into a 150-liter-capacity autoclave and sprayed with 6,059 g of 50% sodium hydroxide solution. Thereafter 22,664 g of methyl chloride and 12,342 g of ethylene oxide are added at the same time, followed by alkalisation in methyl chloride for 30 minutes at 30° to 35° C. The temperature is increased to 40° C. and kept at that level for 3 hours. Neutralisation and cross-linking are carried out in the same way as in Example 1.

A 2% by weight solution of the product has a viscosity of 29,500 mPa.s (shear gradient D=2.93 sec$^{-1}$). The DS in regard to $OCH_3$ amounts to 0.94 and the MS in regard to $OC_2H_4OH$ amounts to 1.74.

EXAMPLE 3

9,100 g of a ground, highly viscous pulp are introduced into a 150-liter-capacity autoclave, followed by the simultaneous addition of 22,664 g of methyl chloride, 6,059 g of 50% sodium hydroxide and 12,342 g of ethylene oxide. After alkalisation for 30 minutes at 30° to 35° C., the temperature is increased to 55° C. and kept at that level for 1 hour. A pressure of approximately 14 bars is established. Neutralisation and crosslinking are carried out in the same way as described in Example 1.

A 2% by weight solution of the product has a viscosity of 34,800 mPa.s (shear gradient D=2.93 sec$^{-1}$). The DS in regard to $OCH_3$ amounts to 0.89 and the MS in regard to $OC_2H_4OH$ amounts to 1.65.

We claim:

1. A process for the production of hydroxyethyl methyl cellulose having a flocculation point of at least 100° C., which comprises reacting alkali cellulose with ethylene oxide in the presence of methyl chloride with a molar ratio of methyl chloride to air-dry cellulose amounting to 6-12, alkalisation and hydroxyethylation being carried out in liquid methyl chloride; and isolating the hydroxyethyl methyl cellulose formed.

2. A process as claimed in claim 1 wherein alkalisation is carried out with from 1.2 to 1.4 moles of NaOH per mole of air-dry cellulose.

3. A process as claimed in claim 1, wherein from 3 to 5 moles of ethylene oxide are used per mole of air-dry cellulose.

4. A process as claimed in claim 1, wherein etherification is carried out at a temperature of from 40° to 70° C.

* * * * *